(No Model.)
F. SINGRE.
FRICTION GEARING FOR COUPLING SHAFTS.
No. 585,539. Patented June 29, 1897.
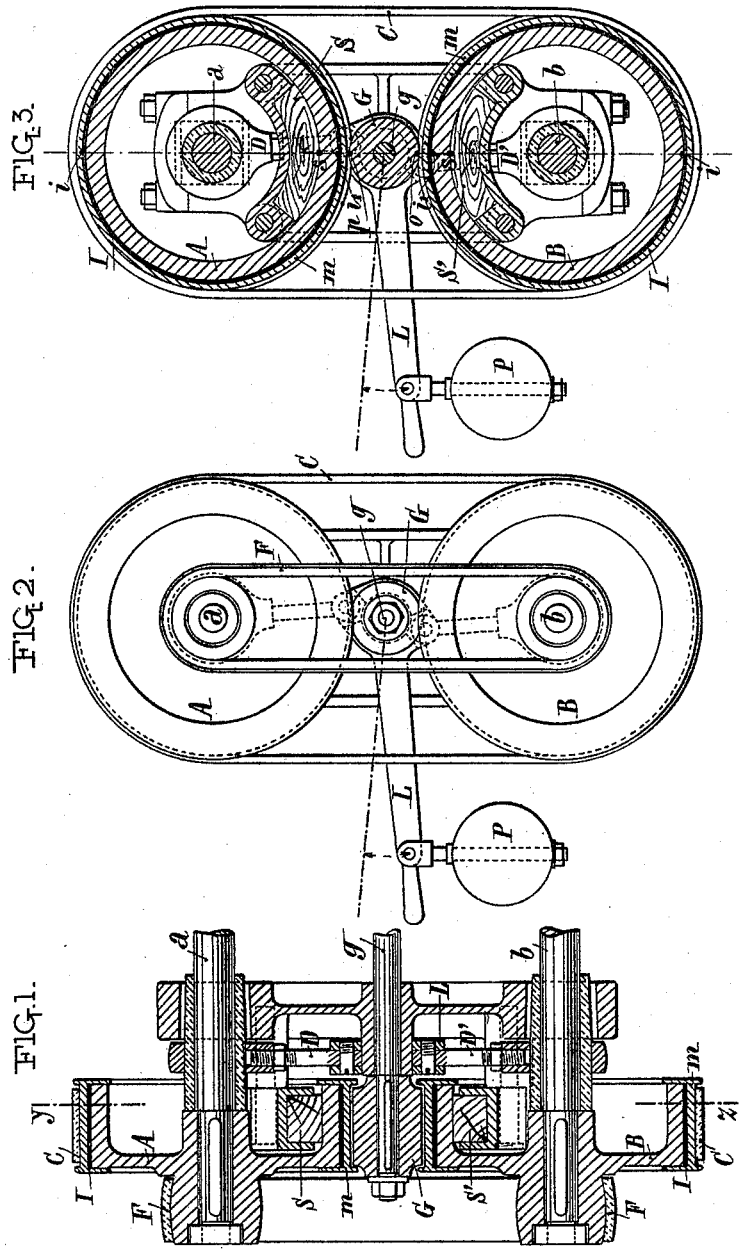
Witnesses
Thos. A. Gunn
Robert Everett
Inventor
François Singre
By James L. Norris
Atty.

UNITED STATES PATENT OFFICE.

FRANÇOIS SINGRE, OF PARIS, FRANCE.

FRICTION-GEARING FOR COUPLING SHAFTS.

SPECIFICATION forming part of Letters Patent No. 585,539, dated June 29, 1897.

Application filed September 12, 1896. Serial No. 605,668. (No model.) Patented in France June 17, 1895, No. 248,191, and March 10, 1896, No. 245,780.

*To all whom it may concern:*

Be it known that I, FRANÇOIS SINGRE, engineer, a citizen of the Republic of France, residing at Paris, France, have invented certain new and useful Improvements in Friction-Gearing for Coupling Shafts, (for which I have obtained a patent of addition in France, No. 245,780, dated March 10, 1896, and French Patent No. 248,191, dated June 17, 1895,) of which the following is a specification, reference being had to the accompanying drawings.

This invention relates to an improved mechanism for actuating two movable parallel shafts by means of a third or driving shaft arranged in the same plane. From this driving-shaft the movement is taken by a combination of two friction devices acting simultaneously, and the diametrically opposite adhesive pressures of these devices are regulated at will, so as to produce a gradual engagement or disengagement of the two shafts without objectionable slipping at the contact-generatrices of the friction-pulleys. The braking and stopping are effected by the operating mechanism which controls the engagement and disengagement of the shafts, the rims of the pulleys being caused to make a third frictional contact by being forced against fixed brake-shoes.

In order that the nature of my invention may be thoroughly understood, I have represented the same in the accompanying drawings, in which—

Figure 1 is a vertical section in a plane passing through the axes of rotation of the pulleys of the device. Fig. 2 is a front view of the mechanism. Fig. 3 represents a transverse section on the line Y Z of Fig. 1.

The friction-roller G of the driving-shaft *g* has its circumferential surface or generatrices *o p* brought in contact with the two pulleys A and B, situated in the same plane as the roller G. Each of these pulleys is formed of a central portion hollowed out and mounted on the shaft and an exterior movable portion composed of a tire *m*, loosely mounted on the rim of the central portion, so as to be capable of turning thereon freely under slight friction. This movable tire is placed either directly on the rim or with the interposition of an isolating substance I I, of wood, leather, or the like, suitably lubricated and serving to deaden the concussions and avoid noise during the working.

A first elastic driving-belt C, of india-rubber or any other suitable material, acting by molecular contraction, partially embraces the movable tires, so as to automatically force them against the roller G at the generatrices of contact *o* and *p*.

The pulleys A and B are provided at their outer sides with projecting pulleys, as will be clearly understood by reference to Fig. 1. These pulleys are connected by a second elastic belt F, which coöperates with the belt C to constantly tend to press the pulleys A and B toward the roller G, as will be obvious. Then in order to regulate the pressure exerted by these elastic driving-belts a device is provided consisting of a lever L, pivoted freely on the axis *g* and connected to the bearings of the shafts *a* and *b* by means of connecting-rods D D', which are on their part pivotally connected to the said lever above and below its center of oscillation. This lever enables the shafts *a* and *b* to be moved toward or away from each other. Its oscillation is limited, on the one hand, when the pulleys A and B are pressed against the generatrices of contact *o* and *p* of the roller G, and, on the other hand, when the rims of the wheels A and B are forced up against the brake-shoes S S', placed near the inner sides of the rims in fixed supports.

The operation of the device is as follows: When the parts occupy the position represented in the drawings, which illustrate, for example, the application of the invention to hoists, windlasses, and the like, the lever L is acted upon by a counterweight P, which keeps the device disengaged, so that the wheels A and B are applied to the brake-shoes S S' at the contact-points *s s'*. In this position the apparatus is thus held immovable. The roller G alone rotates under the action of its driving-shaft. To throw the shafts *a* and *b* into gear, it is sufficient to lift the counterweight P either directly by hand or in any suitable manner, in order to cause the said shafts to move toward each other. When the rising movement is continued, the engagement takes place through the following series of phases: The tires $m$ come in contact with the roller G. Subsequently the pressures at the points $i$ and $i'$, resulting from the elasticity of the belt C, are transferred to the roller at the two points $o$ and $p$, and the tires, becoming free, are carried along by the driving-roller. As the mass of these tires is small, this actuation takes place immediately without any noticeable slipping along the generatrices of contact. The rims of the central portion of the pulleys A and B, acted upon by the second elastic belt F, exert a pressure upon the inside of the tires $m$ $m$ at the points $i'$ $i'$. They are then gradually carried along by the tires in motion according as the operator, who regulates the required pressure of adhesion, desires. The sliding effect produced when the engagement commences takes place all over the surface of contact between the rim and the tire, suitably lubricated, and no longer along the generatrices $o$ and $p$. It is necessary to observe that the engagement of the wheels A and B with the roller G is obtained by the aid of a combined double frictional contact, the one by the rotation of friction-gear, the other by the friction of two circular surfaces. Moreover, the pressure required for the internal actuation of the wheel-rims is added to that of the elastic belt C to produce an excess of pressure along the generatrices $o$ and $p$, thus preventing any slipping or sliding effect at these latter points, not only at the time the engagement is being established but also during the working. The lever L, left to the action of its counterweight, automatically stops the parts set in motion by the shafts $a$ and $b$. The braking effect during the descent of the weight can be obtained either against the fixed brake-shoes S S' or against the movable tires in motion. Consequently the lever L permits of effecting the engagement, the disengagement, and of stopping, as well as the braking of the shafts $a$ and $b$ when these shafts are turned in opposite direction to the lifting motion under the action of the weight previously lifted.

In the operation of the apparatus as here shown the counterweight P of the lever L, acting upon the eccentric-rods, compels the shafts $a$ and $b$ to recede, thus forcing the rims of the pulleys against the brake-shoes $s$ $s'$. In this position, Fig. 1, the pulleys are thrown out of gear and the central driving-roller turns alone. The elastic driving-belt C forces the tires against the rims of the wheels at the points $i$ and $i$. This figure represents the position of arrest.

To effect the disengagement, it is sufficient to raise the lever L, so as to cause the eccentric-rods to draw the shafts $a$ and $b$ toward each other.

In the first phase of the operation, the placing the two tires of the wheels A and B in contact with the driving-roller G, the contact is effected at the two generator-lines $o$ and $p$. The elastic belt C exerts a pressure upon these latter places $o$ and $p$, and as the tires of the wheels are no longer in contact with the rim (see Fig. 2) they are immediately set in motion by the driving-roller G, against which they are pressed energetically by the said driving-belt C. These tires take up the circumferential speed of the driving-roller and run loosely upon the rims of the wheels which are motionless—that is to say, which as yet do not turn.

In the second phase of the operation the placing of the rims of the wheels in contact with the interior of the tires effects the motion of the wheels by continuing the approaching movement of the shafts $a$ and $b$ toward each other until the rims are pressed against the tires at the points $i'$ $i'$, Fig. 3. The pressure exerted upon these points by the combined action of the second elastic belt F, which has the tendency to automatically move the shafts $a$ and $b$ toward each other, and of the lever and eccentric-rods, which the operator actuates in order to increase and regulate the pressure, allows the movement of the rims of the wheels to be effected gradually at will.

Fig. 3 shows likewise that the internal pressure exerted at the points $i'$ $i'$ of the tires is added to that produced by the driving-belt C upon the points of contact $o$ and $p$ of the driving-roller with the exterior rolling-surfaces of the tires. Consequently sliding at these latter points can neither take place when the engagement is effected nor during the regular working of the apparatus to which my mechanism is applied.

The mechanism hereinbefore described and employed as a speed-reducing device may also be used as a speed-increasing device. Moreover, when employed for transmitting small powers the second elastic belt F may be omitted. The pressure at the interior of the movable tires is then obtained by the aid of the regulating-lever and eccentric-rods only. Finally, in cases where this device is to be employed for the traction of vehicles—for instance, of bogie-vehicles—the wheels of the bogie may correspond to the pulleys A and B and be actuated directly by the corresponding driving-roller.

Having thus described my invention, what I claim is—

1. A mechanical device for the transmission of motion by friction, consisting of a driving-roller, two pulleys movable to and from the driving-roller, a lever and eccentric-rods for moving the pulleys, said pulleys exerting upon the driving-roller equal and diametrically opposite pressures and provided with movable tires mounted loosely, under slight friction, on their rims, an elastic driving-belt surrounding the tires and constantly tending to move them toward each other, and brake-shoes against which the rims of the pulleys can also bear to produce a third frictional contact for braking, substantially as described.

2. The combination of two pulleys mounted in movable bearings, a driving-roller interposed between the pulleys, a swinging lever, eccentric-rod connections between the lever and the bearings of the pulleys for moving the latter toward and from the driving-roller, movable tires encircling the pulleys, and a friction-belt encircling the tires, substantially as described.

3. The combination of two pulleys mounted in movable bearings, a driving-roller interposed between the pulleys, a swinging lever, eccentric-rod connections between the lever and the bearings of the pulleys for moving the latter toward and from the driving-roller, movable tires encircling the pulleys, and friction-brakes acting against the internal surfaces of the pulleys, substantially as described.

4. The combination of the two pulleys, the interposed driving-roller, means for moving the pulleys to and from the driving-roller, movable tires encircling the pulleys, isolating substance interposed between the tires and the pulleys, and a friction-belt encircling the tires, substantially as described.

In testimony whereof I have hereunto set my hand in the presence of the two subscribing witnesses.

FRANÇOIS SINGRE.

Witnesses:
 LOUIS SULLIGER,
 DAVID T. S. FULLER.